Patented Dec. 12, 1950

2,534,030

UNITED STATES PATENT OFFICE 2,534,030

ANTIFREEZE COMPOSITION

Edwin H. Keller, Wawa, Pa., assignor to E. I. du Pont de Nemours & Company, Wilmington, Del., a corporation of Delaware No Drawing. Application February 27, 1948, Serial No. 11,829

2 Claims. (Cl. 252—74)

This invention relates to anti-corrosive antifreeze compositions suitable for use as coolants in internal combustion engines. It also relates to processes or methods for preventing corrosion of metals which come in contact with such antifreeze compositions.

For many years it has been known that sodium tetraborate is outstandingly effective as a corrosion inhibitor in alcoholic antifreeze compositions (Kepfer, U. S. 1,911,195). Many attempts have been made to provide improved antifreeze solutions containing inhibitors other than sodium tetraborate. Despite these numerous attempts, much of the antifreeze manufactured in this country at the present time contains the sodium tetraborate corrosion inhibitor disclosed by Kepfer.

It has been discovered in recent years, however, that an improved corrosion inhibiting action can be obtained by using paired inhibitors, e. g. by pairing sodium tetraborate with mercaptobenzothiazole (Keller, 2,373,570) or by employing an alkali metal tetraborate in combination with an alkali metal phosphate (Duus, U. S. application S. N. 337,207, filed May 25, 1940 now abandoned; Canadian Patent 438,016; Kiffer, U. S. 2,384,553). The discovery of the synergistic action of the sodium tetraborate-mercaptobenzothiazole inhibitor has made possible the manufacture of antifreeze compositions which remain non-corrosive for prolonged periods of time. The pairing of an alkali metal tetraborate with an alkali metal phosphate also has given rise to antifreeze compositions superior to those obtainable by the use of individual inhibitors.

The tetraborate-phosphate inhibited antifreeze compositions, while virtually unsurpassed from the standpoint of anti-corrosion properties, have certain disadvantages, viz., when admixed with tap water available in certain cities, these mixtures yield insoluble calcium phosphate which separates out as a precipitate. The sodium tetraborate - mercaptobenzothiazole inhibited antifreeze compositions also tend to develop precipitates after prolonged use, due to the conversion of the mercaptobenzothiazole compound to relatively insoluble organic products, especially when the mixture has been subjected to the action of actinic light. The development of precipitates in alcoholic antifreeze compositions, even though not necessarily affecting the anti-corrosion properties thereof is, nevertheless, highly undesirable from a practical standpoint. Small passageways in the cooling system may become blocked with solid. Also the coolant may take on a rusty appearance, which may lead to discarding the antifreeze solution more frequently than would otherwise be necessary.

An object of this invention is to provide further improvements in antifreeze compositions. A further object is to prepare a non-corrosive antifreeze composition in which the corrosion inhibitor does not tend to become converted to an insoluble precipitate under any of the conditions normally encountered in actual use. A further object is to prepare an ethylene glycol antifreeze which is superior to previously known antifreeze compositions from the standpoint of inhibition against corrosion, precipitate-formation, and foaming tendency. Other objects of the invention appear hereinafter.

It has been discovered in accordance with this invention that alkali metal metaborates are far superior to the previously employed alkali metal tetraborates as antifreeze corrosion inhibitors. Moreover, the alkali metal metaborates according to the invention, are efficient corrosion inhibitors in alcoholic antifreeze compositions even in the absence of added substances such as phosphates which cause the development of precipitates in antifreeze compositions under conditions of actual use. In general, inhibitors which cause rapid attack on solder (e. g. inorganic nitrites, etc.) are avoided in accordance with this invention.

The alcoholic antifreeze compositions which are employed in the practice of the invention contain water-soluble alcohols, e. g. methanol, ethanol, isopropanol, ethylene glycol, propylene glycols, butylene glycols, glycerol, etc., as freezing point depressants. The preferred freezing point depressant is ethylene glycol. The water-soluble alcohols having from 1 to 3 carbon atoms per molecule are, in general, more efficient as freezing point depressants than are alcohols of higher molecular weight.

The quantity of alkali metal metaborate employed as corrosion inhibitor should be 0.5 to 7.5% of the weight of the alcohol. Organic inhibitors, such as mercaptobenzothiazole compounds (e. g. mercaptobenzothiazole, alkali metal mercaptobenzothiazoles, etc.), di-isopropyl amine nitrite, mono-, di- and triethanol amine and salts thereof, etc. may be used in combination with the alkali metal metaborate inhibitor, if desired. The weight of organic inhibitor, when one is used, should be from 0.0001 to 0.5%, based on the weight of alcohol. These organic inhibitors may be omitted altogether, if desired, or they may be used in such extremely small quantities that any precipitate formed therefrom does not noticeably interfere with the improved results obtained through the use of the metaborate as the inorganic inhibitor. The inhibitors may be introduced into a previously used antifreeze mixture, thus providing a reinhibiting effect, if desired.

The pH of the antifreeze solution of this invention is usually within the range of 8.5 to 9.5, as measured on a water solution containing about 33% of the alcohol (plus inhibitor). In more dilute ethylene glycol solution, containing about 10% of the glycol, the pH is somewhat higher, viz. about 10. In general, the pH is within the range of 8.5 to 10. Aqueous solutions containing about 10 to 60% of the freezing point depressant generally have a sufficiently low melting point.

Among the metals which are protected by the herein disclosed antifreeze solutions are aluminum, iron, steel, copper, brass, solder, and the like. The most outstanding improvement in anti-corrosive properties is noted when the water which is used as the diluent for the alcohol contains substantial quantities of chloride.

The following tables provide a comparison of the antifreeze composition of this invention with previously disclosed antifreeze compositions containing sodium tetraborate or tetraborate-phosphate inhibitors. In the figures given in the tables a plus sign indicates that an increase in the thickness of the metal test strip as measured by a gain in weight of the metal, was observed. The corrosion rates not thus marked represent loss of metal from the surface of the test strips.

*Table I.—Avoidance of formation of precipitate in antifreeze compositions*

[33% by volume of ethylene glycol in water]

| Inhibitor (weight percent based on weight of ethylene glycol) | Source of water | Calcium Content of Water [1] P. P. M. | Appearance of Antifreeze Composition |
|---|---|---|---|
| 2.2% borax | Wilmington, Del | 12 | Clear. |
| Do | Marion, O | 70 | Do. |
| Do | Dayton, O | 90 | Do. |
| Do | Galveston, Tex | 18 | Do. |
| 2.5% sodium metaborate | Wilmington, Del | 12 | Do. |
| Do | Marion, O | 70 | Do. |
| Do | Dayton, O | 90 | Do. |
| Do | Galveston, Tex | 18 | Do. |
| 0.77% borax+0.7% 0.77% $NaH_2PO_4$ | Wilmington, Del | 12 | Do. |
| | Marion, O | 70 | Milky—precipitate settled out. |
| Do | Dayton, O | 90 | Do. |
| Do | Galveston, Tex | 18 | Clear. |

[1] The Ca contents of Dayton and Marion water, set forth above, are not unusually high. According to data presented by Collins, Lamar and Lohr, U. S. G. S. Water Supply Paper 658 (1932), the weighted average hardness of public water systems in 22 of the 48 States exceeds 120 (P. P. M. Ca).

*Table II.—Corrosion tests on metal strips suspended in 33 volume percent ethylene glycol in water (160° F., 336 hours, stirring at 1750 R. P. M.)*

| Inhibitor (weight percent based on weight of ethylene glycol) | Source of Water | Corrosion Rate, Inches Penetration per Year × $10^3$ | | | | |
|---|---|---|---|---|---|---|
| | | Aluminum | Cast Iron | Copper | Brass | 50:50 Solder |
| 2.2% borax | Marion, O. (450 P. P. M. sulfate) | 16 | 28 | 0.5 | +0.6 | 3 |
| 6.3% $NaBO_2.2H_2O$ | Marion, O | 0 | 0 | 1.5 | 1 | 0 |
| 2.7% $NaBO_2.2H_2O$ | do | 1 | 3 | 0.6 | 1.3 | 1 |
| 2.5% borax+0.7% sodium phosphate+ 0.20% Na mercaptobenzothiazole | do | 0 | 1 | 0.7 | 0 | 1 |
| 2.2% borax | Galveston, Tex. (300 P. P. M. chloride) | 30 | 46 | 0.5 | 0.6 | 2 |
| 5.0% borax | Galveston, Tex | 13 | 17 | 1 | 0 | 1 |
| 6.3% $NaBO_2.2H_2O$ | do | 1 | 7 | 2 | 0.9 | 1 |
| 2.7% $Na_2BO_2.2H_2O$ | do | 8 | 2 | 0.9 | 0.6 | |
| 2.5% borax+0.70% sodium phosphate+ 0.20% Na mercaptobenzothiazole | do | 3 | 0 | 0.3 | 0 | 0.4 |
| Water only (no ethylene glycol, no inhibitor) | Marion, O. (450 P. P. M. sulfate) | 30 | 145 | 0.5 | 0.5 | 1 |
| Water only (no ethylene glycol, no inhibitor) | Galveston, Tex (300 P. P. M. chloride) | 58 | 32 | +1 | +1 | 19 |

*Table III.—Comparison of rusting tendency and foaming tendency of antifreeze compositions (33% by volume of ethylene glycol in water) in circulating units using automobile radiators and engine blocks*

| Inhibitor (weight percent raised on weight of ethylene glycol) | Time before Rust Appeared in Coolant, hours | Foaming Tendency, Average Volume Liquid Carried over in Foam (c. c.) during test |
|---|---|---|
| 2.2% borax | 520 | 1,000 |
| 6.3% $NaBO_2 2H_2O$ | 1,120 | 800 |
| 2.5% borax+0.70% sodium phosphate+0.2% Na mercaptobenzothiazole | 1,530 | 1,900 |

It is believed to be apparent from the data set forth in the above tables that, in several respects, the phosphate-free metaborate-containing antifreeze is superior to the other antifreeze compositions, which heretofore were considered to be among the best of the heretofore known antifreeze mixtures.

The term "antifreeze composition" as employed in the specification and claims includes the diluted antifreeze in the form in which it is circulated in the engine, and also the undiluted, or partially diluted, form, which is suitable for packaging and shipping in accordance with the practice common in the trade. When the antifreeze composition of this invention is shipped in cans (e. g. cans made of terneplate) there is no corrosion of the metal container; even on prolonged storage the composition, as shipped, generally contains not more than about 10% by weight of water.

Since numerous modifications of the invention will occur to those who are skilled in the art, it is to be understood that I do not limit myself except as set forth in the following claims.

I claim:

1. An antifreeze composition free of phosphate and nitrite and containing from 10% to 60% by volume of ethylene glycol and from 0.5 to 7.5% by weight of alkali metal metaborate corrosion inhibitor, based on the weight of the glycol, the remainder of the composition being substantially all water, said antifreeze composition being suitable for use in an internal combustion engine cooling system.

2. An ethylene glycol anti-corrosive antifreeze composition containing from 0.5 to 7.5% by weight of sodium metaborate and a quantity of mercaptobenzothiazole compound of the class consisting of mercaptobenzothiazole and the akali metal salts thereof within the range of 0.0001 to 0.5% of the weight of the ethylene glycol, there being present no other corrosion inhibitor, said composition being characterized in that it has a pH within the range of 8.5 to 9.5 when diluted with water until the ethylene glycol content is 33%.

EDWIN H. KELLER.

REFERENCES CITED

The following references are of record in the file of this patent:

UNITED STATES PATENTS

| Number | Name | Date |
|---|---|---|
| 1,964,808 | Bottoms | July 3, 1934 |
| 2,386,182 | Balcar | Oct. 9, 1945 |

OTHER REFERENCES

Mellor's "Modern Inorganic Chemistry," revised edition (1939). Longmans, Green and Co., N. Y., p. 662.